United States Patent [19]
Stoliar et al.

[11] 3,782,824
[45] Jan. 1, 1974

[54] APPARATUS AND METHOD FOR MEASURING EXTINCTION COEFFICIENT OF AN ATMOSPHERIC SCATTERING MEDIUM

[75] Inventors: Arthur P. Stoliar, New York, N.Y.; Richard T. Brown, Jr., Bolton, Mass.

[73] Assignee: Sperry Rand Corporation, New York, N.Y.

[22] Filed: June 1, 1972

[21] Appl. No.: 258,688

[52] U.S. Cl.................................. 356/103, 356/201
[51] Int. Cl............................................ G01n 21/00
[58] Field of Search..................... 356/103, 104, 201

[56] References Cited
UNITED STATES PATENTS
3,510,225   5/1970   Collis................................ 356/103

Primary Examiner—Ronald L. Wibert
Assistant Examiner—Conrad Clark
Attorney—Howard P. Terry

[57] ABSTRACT

An apparatus and method of determining the extinction coefficient of an atmospheric scattering medium utilizing a transceiver having concentric transmitter and receiver fields, wherein backscattered energy from each of a series of transmitted optical pulses is sampled at two discrete intervals (corresponding to discrete ranges) between successively transmitted pulses and integrated as a function of the ratio of the ranges to provide compensation for differential range attenuation losses. The ratio of the integrator outputs is then obtained and the natural logarithm of the ratio calculated to obtain the extinction coefficient from which a determination of atmospheric visibility may be made.

15 Claims, 6 Drawing Figures

APPARATUS AND METHOD FOR MEASURING EXTINCTION COEFFICIENT OF AN ATMOSPHERIC SCATTERING MEDIUM

BACKGROUND OF THE INVENTION

1. Field of the Invention

This invention relates to an improved apparatus and method of measuring the extinction coefficient of an atmospheric scattering medium from which an indication of atmospheric visibility may be determined in accordance with the well known relationship between the extinction coefficient and visibility as originally formulated by Koschmieder.

2. Description of the Prior Art

State of the art atmospheric visibility measuring devices are usually of the so-called double-ended type wherein the transmitter and receiver are spaced from one another along the path over which the measurement is to be made. These systems are impractical for many applications, however, since the precise alignment required between the transmitter and receiver involves a rather elaborate setup procedure with a need for periodic realigning and, moreover, generally limits the maximum distance between the transmitter and receiver to ranges on the order of a few hundred to perhaps several hundred feet. In addition, it will be appreciated that double-ended systems are obviously unwieldy and in some instances even unsuitable for measurement along slant ranges, for example, along an aircraft line of sight to ground. For these reasons, single-ended systems in which the transmitter and receiver are proximate one another in side by side or concentric relation have attracted more interest in recent years.

Since the atmospheric medium under investigation is inherently a volume backscatterer, information relating to the extinction coefficient is obtained in a single-ended system by appropriately processing detected backscattered energy of a transmitted pulse. Early state of the art single-ended systems typically utilized amplitude measurement techniques for the purpose of obtaining the visibility information. To obtain any degree of accuracy with such techniques required careful calibration and precise knowledge of the transmitted power and receiver gain with resultant complex design. Notwithstanding efforts to deal with these problems, however, it was subsequently discovered that amplitude measuring systems were inherently limited because of the sensitivity of the backscattered pulse amplitude to the composition, that is the number, type and size, of the atmospheric medium being probed. In other words, it was found that determination of the extinction coefficient from a measurement of the backscattered pulse amplitude based on the simple proposition that the backscattered energy would be proportionately greater for increasingly poorer visibility conditions did not provide accurate data because the amplitude of the backscattered energy is affected not only by the degree of visibility but also by the composition of the probed medium. Moreover, the amplitude responsive system requires either a priori knowledge or an assumption of the backscatter and absorption characteristics of the atmospheric medium under investigation in order to make the measurement. An intuitive appreciation of the nature of this problem can be obtained simply by recognizing that for any given degree of backscatter, the detected backscattered pulse energy will be less in the case of a medium of high absorption than it would for a medium of lower absorption and thus tend to indicate that the visibility was better than it actually is. Conversely, if the absorption is low, the backscattered pulse energy will be correspondingly greater thereby tending to indicate that the visibility is poorer than it actually is. Likewise, for a given absorption condition, the backscattered pulse energy will be correspondingly greater and smaller for higher and lower backscatter coefficients with resulting errors in visibility determination. In actual practice the measurement is dependent, of course, on the inter-relation of the absorption and backscatter coefficients. These problems and the errors that may arise therefrom were avoided by a more recently developed single-ended system disclosed in U.S. Pat. No. 3,519,354 issued July 7, 1970 to R. T. Brown Jr. et al and assigned to the instant assignee. That system utilizes other characteristics of the backscattered energy which are not sensitive to the nature of the probed medium system measuring the visibility. Specifically, in the prior Brown et al system, a transmitter and receiver having divergent fields of view are positioned in spaced relation along a base line so that the respective fields begin to overlap paritally commencing at a predetermined distance from the base line whereby the overlapped area proportionately increases with increasing range because of the diverging nature of the fields. As a result of this unique optical configuration, when a pulse of energy is transmitted no backscattered energy is received initially until the point of overlap is reached, thereafter the backscattered energy increases for a time because of the increasing area of the overlap region, and finally the detected energy begins to decrease when the increased attenuation attendant to increased range becomes the predominant factor. By appropriate processing of this detected backscattered pulse energy, the extinction coefficient can be determined from either the time-to-peak after transmission, width of the detected pulse at the half power points, or decay rate of the trailing edge of the pulse. None of these features is related to pulse amplitude and thus the system is not sensitive to the characteristics of the probed atmospheric medium. The principal disadvantage of the sytem is that precise relative optical alignment of the transmitter and receiver is required to assure accurate data in view of the fact that the data is dependent on precise knowledge of the range of initial overlap and area of the overlapped region as a function of range.

The present invention offers the advantage of not requiring either previous knowledge or an assumption of the absorption and backscatter characteristics of the medium under investigation. This will be understood more clearly after reading the detailed description provided hereinafter. The prior art systems have the further limitation of being restricted to making measurements in homogeneous media, that is, the medium must be such that the extinction coefficient is constant over a comparatively long range. This limitation also is obviated in the case of the present invention as will be explained more throughly in the subsequent detailed description.

In view of the above comments, it is a principal object of the present invention to provide a novel apparatus and method of atmospheric extinction coefficient determination which eliminates the need for precise calibration and optical alignment and assures accurate measurements irrespective of the absorption, backscatter, composition and homogeneity characteristics of the scattering medium.

SUMMARY OF THE INVENTION

In accordance with the principles of the invention, a pulsed optical transceiver incorporating concentric transmitting and receiving optics is provided for transmitting narrow beam optical pulses in the scattering medium whose extinction coefficient is to be determined. The amplitude of pulse energy backscattered from the medium is, as previously explained, a function of the scattering and attenuating properties of the medium as well as the distance from the transceiver at which the energy is backscattered. The detected backscattered pulse energy is uniquely processed, however, so that only the extinction characteristics of the medium, that is, only the characteristics which affect visibility, influence the measurement. This is accomplished by sampling the backscattered energy of each transmitted pulse at successive increments of pulse travel time, corresponding to discrete closely separated ranges from the transceiver, and determining the ratio of the respective sampled amplitudes. If the difference between the discrete ranges is small enough, the backscatter coefficient at each range is essentially the same. Thus, by compensating the amplitude of the sampled backscattered pulses to compensate for amplitude differences resulting from the difference in range, any remaining amplitude difference will be accurately representative of the extinction coefficient.

The range compensation or normalization is preferably performed by a digital pulse integration technique precisely scaled to the range of the respective samples. Inasmuch as the amplitude of the detected backscattered energy is inversely proportional to the square of the range, it will be apparent that a detected signal from a first range twice as great as a second range will have only one-fourth the amplitude of the detected signal from the second range. This range dependent amplitude difference is compensated for by integrating respective numbers of each sample in inverse proportion to the square of the relative ranges. In other words, for samples corresponding to a first range, a prescribed number of pulses is integrated to obtain a suitable signal-to-noise ratio in accordance with the sensitivity of the receiver while at a second range, twice that of the first range, four times as many pulse samples would be integrated to provide the desired range compensation. Thus, the range compensation is provided by a simple pulse integrating technique having the advantage of permitting transmission of relatively low energy pulses which are economical to generate and do not create a physiological hazard. In addition, the linearity requirements of the detector are reduced as is electromagnetic interference normally associated with high energy pulses. Moreover, it will be appreciated that a high degree of pulse-to-pulse stability of the transmitted pulses is not required since the measurement is based on comparison of backscattered pulses produced in response to each transmitted pulse.

DESCRIPTION OF THE PREFERRED EMBODIMENTS

Figure 1:
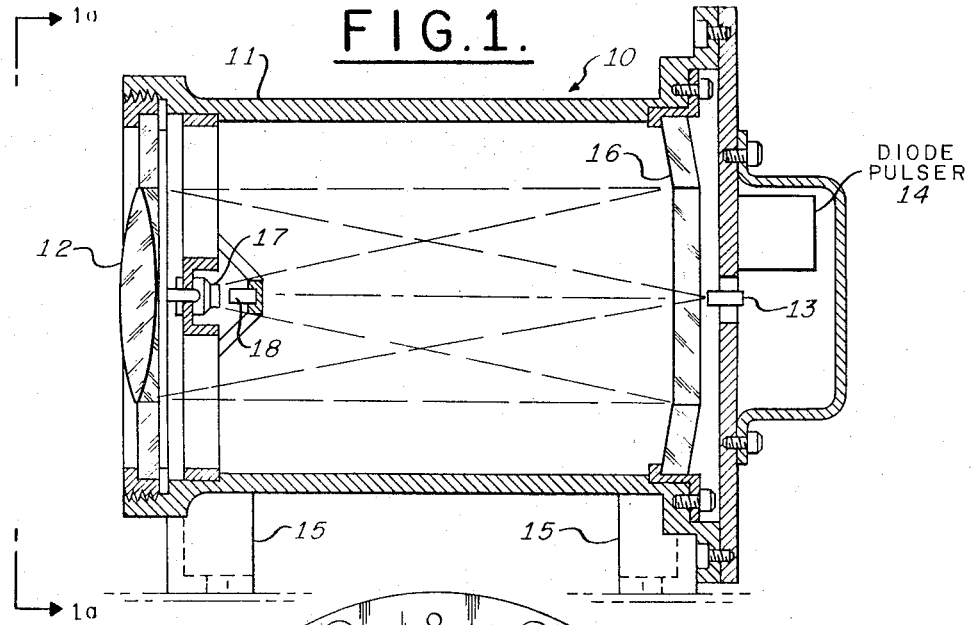
FIGS. 1a and 1b are front and side views respectively of the optical section of the transceiver used in a preferred embodiment of the inventive apparatus.
Figure 1A:
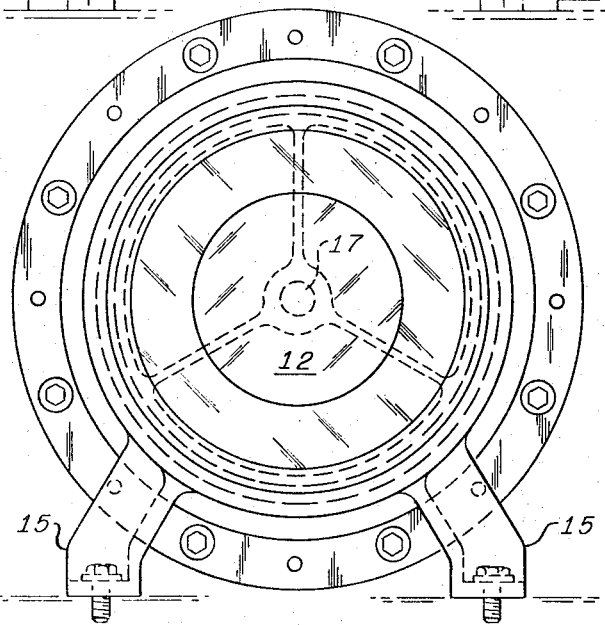
Figure 2:
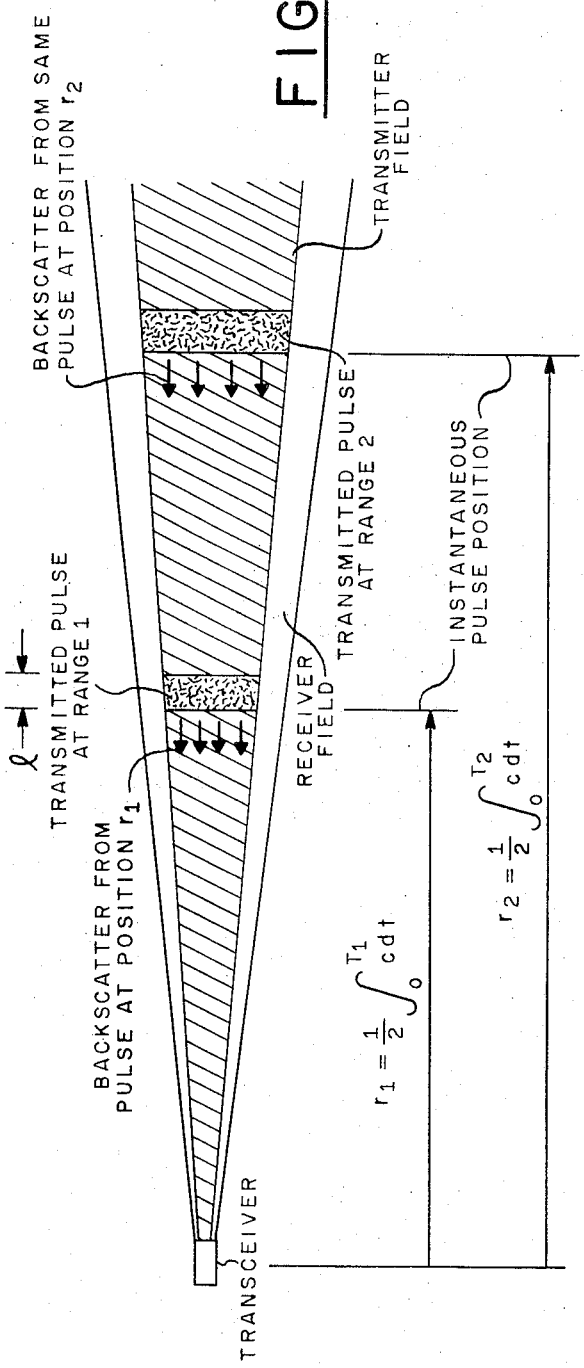
FIG. 2 is an illustration of the transmitter and receiver fields of view and transmitted and backscattered pulses therein which is useful in explaining the operation of the inventive apparatus.

Referring to FIGS. 1a and 1b, the transceiver of the inventive apparatus comprises an optical section 10 having a cylindrical housing 11 with a front end lens assembly 12 through which transmitted pulses are directed and backscattered radiation is collected. The transmitted pulses are provided by an optical source 13 positioned at the focal point of the front end lens so as to transmit highly directional pulses which as a practical matter are slightly diverging as illustrated in FIG. 2. The source may be constructed of optically pumped crystals or injection diode laser arrays of the type disclosed in U.S. Pat. No. 3,641,400 issued Feb. 8, 1972 to E. Rocks et al and assigned to the instant assignee. These optical sources will provide the desired pulse repetition rates and narrow beam radiation of suitable intensity to preclude physiological hazards. The rear part of the optical section typically includes a pulser or modulator 14 for driving the optical source in addition to any required heat exchanging and cooling equipment (not shown). Legs 15 support the optical section on suitable mounting means. The modulator functions to drive the optical source to generate pulses at the desired repetition rate for transmission through the front end lens into the narrow beam transmitter field. Reception of backscattered energy of the transmitted pulses is performed by the receiver lens 16 to focus the collected backscattered energy on detector 17. The detector typically includes a preamplifier and spectral filter and should be characterized by good sensitivity at the wavelength of the optical source with a linear dynamic range of power to six orders of magnitude. Mask 18 blocks the transmitted pulse energy from the detector. In the absence of such baffling, the minimum operating range of the apparatus would be limited in accordance with the detector recovery time after each transmitted pulse. The receiving optics is designed to have a field of view concentric with and slightly overlapping the transmitter field as shown in FIG. 2 to reduce the effect of background radiation. Thus, backscattered energy of each transmitted pulse is continuously incident on the detector except from a small near field conical shaped region adjacent the front end lens inherently resulting from the configuration of the transceiver optics but, as previously explained, the detector output is sampled between successive transmitted pulses for further signal processing only at prescribed time intervals corresponding to discrete ranges of backscattered energy.

Before proceeding to a description of the signal processing section, an analytical description of the principal of operation will be provided. This is best explained by analysis of the so-called coaxial lidar equation which formulates the radiation received as backscatter from fog or other small particles distributed throughout the space in which the transmitted optical pulses propagate. On the basis of a single transmitted pulse, backscattered radiation is continuously received as the traveling pulse continuously encounters additional particles. The received radiation decreases in intensity as a function of pulse travel time according to inverse range square losses and exponential decay losses produced by scattering and absorption attentuation called extinction. At any instant of pulse travel time (or range), the magnitude of the detected radiation may be expressed mathematically as:

$$P_R(r) = \frac{P_t l A_e B_\pi(r)}{8\pi r^2} \exp\left[-2\int_0^r \sigma(x)dx\right] \quad (1)$$

where $P_t$ is the peak transmitted power, $l$ is the pulse length, $A_e$ is the effective receiver aperture, $B_\pi(r)$ is the volume backscatter coefficient at rate $(r)$, $\sigma(x)$ is the volume extinction coefficient at range $(x)$, and $r$ is the range to which the transmitted pulse has propagated at any instant of time.

Figure 3A:
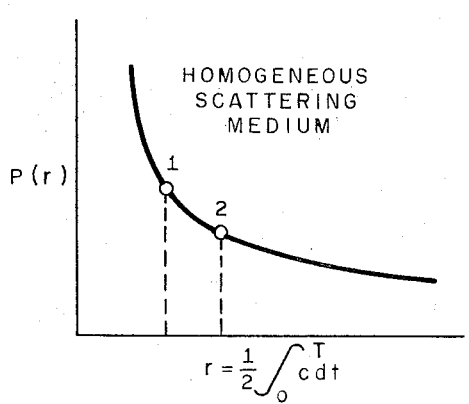
FIGS. 3a and 3b are waveforms depicting the characteristics of homogeneous and heterogeneous scattering media, respectively, which are useful in explaining the theory of operation of the invention.

Because of the inverse range squared factor in equation (1), the detected backscattered radiation plotted as a function of pulse travel time or range appears as shown in FIG. 3a for the case of radiation transmitted in a homogeneous scattering medium, the shape of the decaying curve being determined by the range related parameters of the equation, namely $$\frac{B_\pi(r_i)}{r_i^2} \exp\left[-2\int_0^r \sigma(x)dx\right].$$

The parameter desired to be extracted for the measurement is $\sigma(x)$ which determines the optical visibility. The method of measurement used in accordance with the present invention is based on application of equation (1) to two or more range points of the detected backscattered radiation. For example, equation (1) rewritten for range points 1 and 2, respectively, of FIG. 3a yields $$P_R(r_1) = \frac{P_t l A_e B_\pi(r_1)}{8\pi r_1^2} \exp\left[-2\int_0^{r_1} \sigma(x)dx\right] \quad (2)$$

and $$P_R(r_2) = \frac{P_t l A_e B_\pi(r_2)}{8\pi r_2^2} \exp\left[-2\int_0^{r_2} \sigma(x)dx\right] \quad (3)$$

The ratio of the detected powers at ranges 1 and 2 is thus $$\frac{P_R(r_1)}{P_R(r_2)} = \frac{r_2^2 B_\pi(r_1)}{r_1^2 B_\pi(r_2)} \exp\left[2\int_{r_1}^{r_2} \sigma(x)dx\right] \quad (4)$$

where the terms $p_t$, $l$, $A_e$ and $8\pi$ cancel in view of the fact that the detected backscattered radiation at both ranges is produced by the same transmitted pulse. If, as a first approximation, the scattering medium is assumed to be homogeneous, $B_\pi(r_1) = B_\pi(r_2)$ and therefore $$\exp\left[2\int_{r_1}^{r_2} \sigma(x)dx\right] = \frac{P_R(r_1)r_1^2}{P_R(r_2)r_2^2} \quad (5)$$

Recognizing that $$\int_{r_1}^{r_2} \sigma(x)dx = \bar{\sigma}(r_2 - r_1)$$

where $\bar{\sigma}$ is the mean over the interval $r_1$ to $r_2$, we may solve equation (5) for $\bar{\sigma}$ giving $$\bar{\sigma}_{r_1 \to r_2} = \frac{1}{2(r_2 - r_1)} \ln\left[\frac{P_R(r_1)r_1^2}{P_R(r_2)r_2^2}\right] \quad (6)$$

In other words, to determine the means extinction coefficient for a finite range interval, it is necessary merely to measure the received radiation from the beginning and end of that range interval. The range information required by equation (6) is known a priori. By selecting the range interval $r_1 \to r_2$ small enough, $\bar{\sigma}_{r_1 \to r_2}$ approaches an actual point value $\sigma_{r_1}$.

Figure 3B:
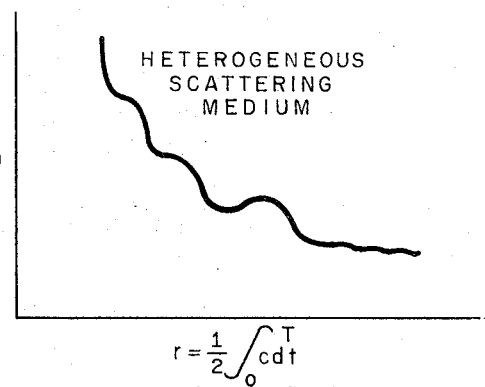

In actual practice, fog, haze and mist which restrict visibility are quite often not homogeneous but rather are of a heterogeneous nature in which case the detected backscattered radiation plotted as a function of range is likely to have a random decay rate as illustrated by the curve of FIG. 3b. Under such conditions, the backscatter coefficient will have different values at different ranges and thus equation (5) will more properly be wrtieen as $$\exp\left[2\int_{r_1}^{r_2} \sigma(x)dx\right] = \frac{P_R(r_1)r_1^2}{P_R(r_2)r_2^2} \frac{B_\pi(r_2)}{B_\pi(r_1)} \quad (5')$$

from which $$\bar{\sigma}_{r_1 \to r_2} = \frac{1}{2(r_2 - r_1)} \ln\left[\frac{P_R(r_1)r_1^2}{P_R(r_2)r^2} \frac{B_\pi(r_2)}{B_\pi(r_1)}\right] \quad (6')$$

If the entire detected radiation waveform is broken into equal finite intevals $\Delta r_i = r_i - r_{i+1}$, the average extinction coefficient over the range is given by $$\bar{\sigma} = \frac{1}{n}\sum_{i=1}^{n} \sigma_{\Delta r_i}$$

$$= \frac{1}{2n\Delta r_i}\left[\sum_{i=1}^{n} \ln \frac{P_R(r_i)r_i^2}{P_R(r_{i+1})r_{i+1}^2} + \ln \sum_{i=1}^{n} \frac{B_\pi(r_{i+1})}{B_\pi(r_i)}\right] \quad (7)$$

In application of equation (7) according to the method of the present invention, the inverval $\Delta r$ is taken as small as practical so that the scattering medium within that interval is as uniform as possible. This, of course, is limited by the sampling width or time duration. A sampling width, for instance, of 50 nanoseconds corresponds to a length of 25 feet and therfore two detected samples would have to be spaced by at least that amount. With very small range spacings, $B_\pi(r_{i+1})/B_\pi(r_i)$ approaches unity and again the extinction coefficient is determined by power ratios alone. The mean extinction coefficient for any pathlength is determined by summing the appropriate power ratios and averaging. The effects of inhomogeneity can be accounted for by considering the relative behavior of the chain of extinction coefficients computed for the successive relatively homogeneous range intervals.

Figure 4:
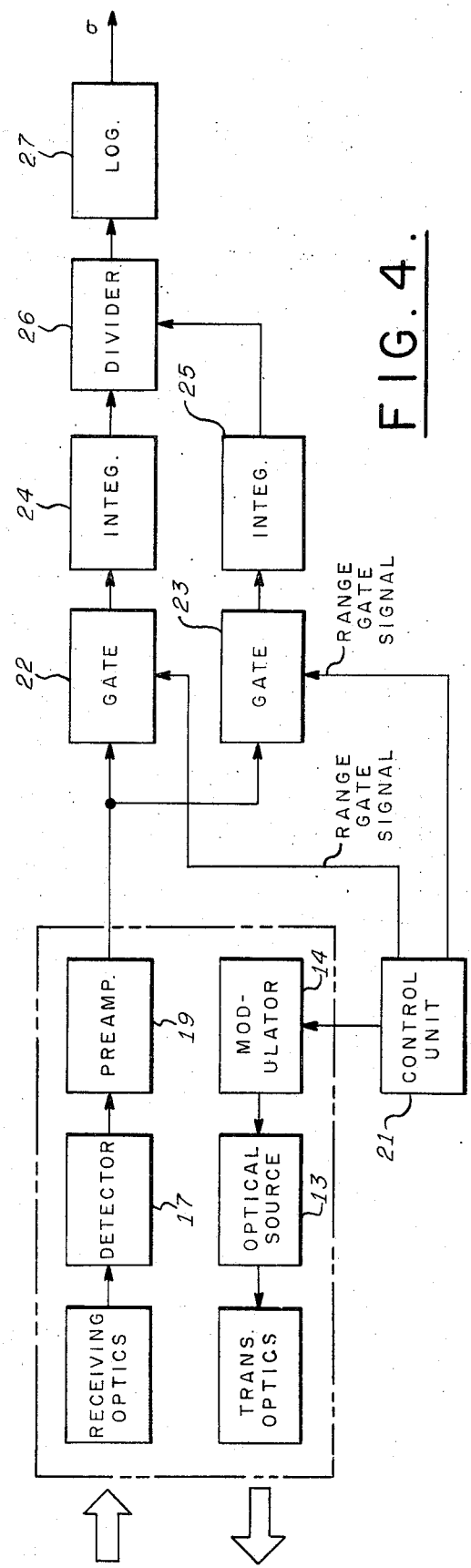
FIG. 4 is a schematic block diagram of the optical and signal processing sections of the preferred embodiment.

Returning now to a description of the transceiver apparatus, implementation of equation (1) in a manner to sample detected backscattered energy of each transmitted pulse at discrete ranges and calculate the natural log of the ratio of the sample pulses is performed by means of the apparatus shown in FIG. 4 wherein the optical section 10 is constructed as previously described with reference to FIGS. 1 and 2. Each transmitted pulse, which is typically on the order of 50 to 100 nanoseconds duration corresponding to an atmospheric pathlength of about 25 to 50 feet, is generated upon application of a trigger signal to the modulator from control unit 21 which accurately regulates the number of transmitted pulses, the number being limited so as to achieve sufficient maximum signal-to-noise and provide range compensation. In addition, the control unit regulates the pulse repetition rate so that the number of pulses is limited in accordance with the maximum range desired to be probed without ambiguities caused by backscatter from further ranges. In response to each transmitted pulse, a signal is produced at the output of preamplifier 19 connected to detector 17 having an amplitude as a function of time representative of backscattered power. In the interval between successive transmitted pulses, at a predetermined time interval after each pulse, range gate signals are supplied from the control unit to gates 22 and 23 respectively. Upon being actuated by a range gate signal, gate 22 opens and applies the detector preamplifier output signal to the input of integrator 22. Likewise, gate 23, upon being actuated by a range gate signal, applies the detector preamplifier output signal to the input of integrator 25. The control unit includes manually operable selectors for selecting the ranges at which measurements are desired to be made. Additional selector controls are provided for controlling the length of time for which the range gates are held open after each transmitted pulse. After the integration process at each range, the output of integrator 24 is divided by the output of integrator 25 in divider 26 to obtain the power ratio required in accordance with equation (6). The divider output, in turn, is coupled to logarithmic unit 27 which derives the natural logarithm of the divider output signal and provides the required multiplication factor ½ $(r_2-r_1)$. Thus, at the conclusion of the integration process, the logarithmic unit output is proportional to the value of the extinction coefficient in the range interval between the pair of sampled ranges. By averaging of the extinction coefficient measurements made at a plurality of ranges, a value proportional to the visibility along the entire line of sight can be obtained as explained in the following paragraphs. Before proceeding with a discussion of multirange averaging techniques, it should first be understood that in any case the division, integration and logarithmic manipulations may be performed in any arbitrary order. The aforedescribed sequence is considered preferable, however, from the viewpoint of providing enhanced measurement accuracy and decreasing the operational requirements of the system components. For example, suppose the same number of pulses was integrated at each range. The range compensation could then be provided after dividing the respective range signals or even after taking the logarithm of the ratio. Alternatively, the logarithm of each signal could be obtained first and then the range compensation provided and so on in any desired order. In the case of such alternative implementation, however, the signals representative of the different ranges would have substantially different magnitudes and therefore require a divider having a considerably larger dynamic range than is needed for the preferred instrumentation in which the number of pulses integrated is adjusted in accordance with range.

Although the foregoing description has referred to only two discrete range measurements, it will be apparent that a plurality of measurements could be made at uniform range increments of say every 100 feet where the extinction coefficient in the range from 100 to 200 feet may be determined by computing the ratio of the measurements made at 100 feet and 200 feet respectively while the extinction coefficient in the range of 200 feet to 300 feet is likewise determined by computing the ratio of the measurement at 200 feet and 300 feet. Alternatively, the measurements may be made in spaced pairs, say 100 feet apart at 500 feet intervals, to obtain measurements at 500 and 600 feet, 1,000 and 1,100 feet, 1,500 and 1,600 feet and so on. As a general rule or practice, the discrete range sample intervals may be small, on the order of 50 to 100 feet, at short ranges up to several hundred or perhaps a thousand feet or slightly more, but preferably should be made larger at longer ranges. The most frequently encountered conditions will typically limit the range difference between a pair of samples to a range of from about 25 feet to 500 feet. In any case, the spacing or time interval between successive transmitted pulses should be sufficiently long to assure that no backscattered energy is received from an earlier pulse after transmission of the immediately preceding pulse in the series of transmitted pulses, that is, the samples radiation should be backscattered from only the preceding transmitted pulse. Thus, under conditions of transmitter power, receiver gain and normally encountered visibility where the measurement is limited to a range of say 5,000 feet, the interval between transmitted pulses should be at least 10 microseconds and preferably even longer. Longer range measurements will, of course, require proportionately lower pulse repetition rates. It should be understood, however, that the maximum range measurement is dependent on whether a line of sight is possible over the range and on the prevailing visibility conditions since obviously the ability of the transmitted pulses to penetrate the scattering medium will be severely restricted under adverse weather conditions of dense fog, haze, etc.

Irrespective of the particular range interval selected, when a plurality of samples are taken for the purpose of implementing equation (7), the measurements may be made either sequentially or simultaneously. For sequential measurements, the apparatus of FIG. 4 would be used in the aforedescribed manner to calculate the extinction coefficient in an interval between a first pair of selected ranges during a first sequence of transmitted pulses, then in an interval between a second pair of selected ranges during a second sequence of transmitted pulses, and so on, with each of the extinction coefficient measurements being stored so that the average or mean value can be calculated. For simultaneous processing, on the other hand, additional pairs of range gates and integrators with associated divider and logarithmic units would be needed so that the measurements corresponding to the selected pairs of range intervals could be performed by taking the plurality of sample pairs between seccessively transmitted pulses of a single sequence of transmitted pulses. Thus, respective pairs of gates and integrators with associated dividers and logarithmic units would be used to make the measurements at the respective pairs of ranges. Regardless of whether the measurements are made sequentially or simultaneously though, it should be understood that the average value of the extinction coefficient over a plurality of range intervals is computed as explained with refernece to equations (5'), (6') and (7) above.

At this point it should be apparent that the invention also has the capability for determining the location (range) of points of discontinuity in the scattering medium. For instance, if a discontinuity occurs at a range of say 1,000 feet, a pair of range measurements at 800 feet and 1,200 feet respectively will be completely inconsistent thereby indicating the presence of the discontinuity. This feature of the invention is related to its capability to operate in a non-homogeneous medium and is further related to its applicability to other uses such as pollution monitoring wherein the equipment may be set up, for example, to operate along a slant range from say a convenient ground point to the peak of a smoke stack where the discrete sample ranges are selected to lie within the volume of the smoke emission.

While the invention has been described in its preferred embodiment, it is to be understood that the words which have been used are words of description rather than limitation and that changes within the purview of the appended claims may be made without departing from the true scope and spirit of the invention in its broader aspects.

We claim:

1. In a system for determining the extinction coefficient of an atmospheric scattering medium, apparatus comprising
    a transceiver including transmitter means for transmitting a series of pulses of radiation along a common propagational path in the scattering medium whose extinction coefficient is to be determined and receiver means proximate the transmitter means having a field of view aligned with the path of the transmitted pulses so as to overlap substantially the full length of the transmitter field for detecting pulse energy backscattered from the scattering medium,
    first integrator means connected to receive in the interval between successive transmitted pulses detected energy of the preceding transmitted pulse backscattered from the scattering medium at a first range from the transceiver,
    second integrator means connected to receive in the interval between successive transmitted pulses detected energy of the preceding transmitted pulse backscattered from the scattering medium at a second range from the transceiver, and
    the first and second integrator means being connected to receive respective numbers of detected energy pulses in proportion to the square of the first and second ranges.

2. The apparatus of claim 1 including means for computing the ratio of the output signals of the first and second integrators and obtaining the natural logarithm of the ratio to determine the extinction coefficient.

3. The apparatus of claim 1 including means for controlling the timing sequence of the transmitted pulses.

4. The apparatus of claim 3 including means for receiving the output signals of the first and second integrator means to compute the extinction coefficient.

5. In a system for determining the extinction coefficient of an atmospheric scattering medium, apparatus comprising
    transmitter means for irradiating the scattering medium whose extinction coefficient is to be determined with a series of pulses of radiation directed along a common propagational path,
    receiver means having a field of view concentric with the propagational path of the transmitted pulses and including a detector for detecting pulse energy backscattered from the scatter-ing medium,
    first and second integrator means,
    means for coupling the detector output to the first integrator means between succeeding transmitted pulses at a first predetermined time after the preceding transmitted pulse and coupling the detector output to the second integrator means between succeeding transmitted pulses at a second predetermined time after the preceding transmitted pulse, and
    the detector output being coupled to the first and second integrator means individually distinct numbers of times in the course of a series of transmitted pulses in proportion to the square of the ranges associated with the respective integrator means to compensate the output signals of the integrator means for amplitude differences therebetween attributable to the differential range of the detected backscattered energy coupled thereto.

6. The apparatus of claim 5 including means for computing the ratio of the output signals of the first and second integrators and deriving the natural logarithm of the ratio to determine the extinction coefficient.

7. The apparatus of claim 5 wherein the coupling means includes means for controlling the timing sequence of the transmitted pulses.

8. The apparatus of claim 7 including means for receiving the output signals of the first and second integrator means to compute the extinction coefficient.

9. The apparatus of claim 8 wherein the means for computing the extinction coefficient includes means for computing the ratio of the output signals of the first and second integrator means and deriving the natural logarithm of the computed ratio from which the extinction coefficient may be determined.

10. In a system for determining the extinction coefficient of an atmospheric scattering medium, apparatus comprising
    transmitter means for generating radiation to irradiate the scattering medium whose extinction coefficient is to be determined,
    receiver means proximate the transmitter means having a field of view overlapping substantially the full length of the transmitter field for receiving transmitted radiation backscattered from the scattering medium,
    means for sampling received radiation backscattered at first and second discrete ranges from the transmitter, and
    means for compensating the radiation samples for amplitude differences therebetween attributable to the differential range of the respective samples 11. The appartus of claim 10 including means for computing the ratio of the amplitude compensated samples and obtaining the natural logarithm of the ratio to determine the value of the extinction coefficient.

12. The apparatus of claim 11 wherein the receiver field of view is concentric with the propagational path of the transmitted pulse.

13. In a system for determining the extinction coefficient of an atmospheric scattering medium, apparatus comprising
    transmitter means for irradiating the scattering medium whose extinction coefficient is to be determined with a series of pulses of radiation directed along a common propagational path,
    receiver means having a field of view concentric with the propagational path of the transmitted pulses for detecting pulse energy backscattered from the scattering medium,
    means for sampling the detected backscattered energy received from a plurality of pairs of discrete spaced ranges from the transmitter,
    means for compensating the sampled detected energy of each pair of ranges for amplitude differences attributable to the differential range associated with each pair of ranges, and
    means for computing the ratio of the compensated sampled detected energy of each pair of ranges and driving the natural logarithm thereof from which the mean value of the extinction coefficient of the scattering medium over the full range of the range pairs may be calculated.

14. A method for determining the extinction coefficient of an atmospheric scattering medium comprising the steps of
    providing a transmitter for generating radiation to irradiate the scattering medium whose extinction coefficient is to be determined,
    providing a receiver proximate the transmitter having a field of view overlapping substantially the full length of the transmitter field for receiving radiation backscattered from the scattering medium,
    sampling received radiation backscattered at first and second discrete ranges from the transmitter, and
    compensating the radiation samples for amplitude differences therebetween attributable to the differential range of the respective samples.

15. A method for determining the extinction coefficient of an atmospheric scattering medium comprising the steps of
    providing a transmitter for irradiating the scattering medium whose extinction coefficient is to be determined with a series of pulses of radiation directed along a common propagational path,
    providing a receiver having a field of view concentric with the propagational path of the transmitted pulses and including a detector for detecting pulse energy backscattered from the scattering medium,
    providing first and second integrator means,
    coupling to the input of the first integrator means in the interval between successive transmitted pulses detected energy of the preceding transmitted pulse backscattered from the scattering medium at a first range from the transmitter,
    coupling to the input of the second integrator means in the interval between successive transmitted pulses detected energy of the preceding transmitted pulse backscattered from the scattering medium at a second range from the transmitter, and
    the detector output being coupled to the first and second integrator means individually distinct numbers of times in the course of a series of transmitted pulses in proportion to the square of the ranges associated with the respective integrator means to compensate the output signals of the integrator means for amplitude differences therebetween attributable to the differential range of the detected backscattered energy coupled thereto.

* * * * *